S. H. Gilman,
Steam Boiler Furnace.
Reissued Aug 6, 1856.
No 383
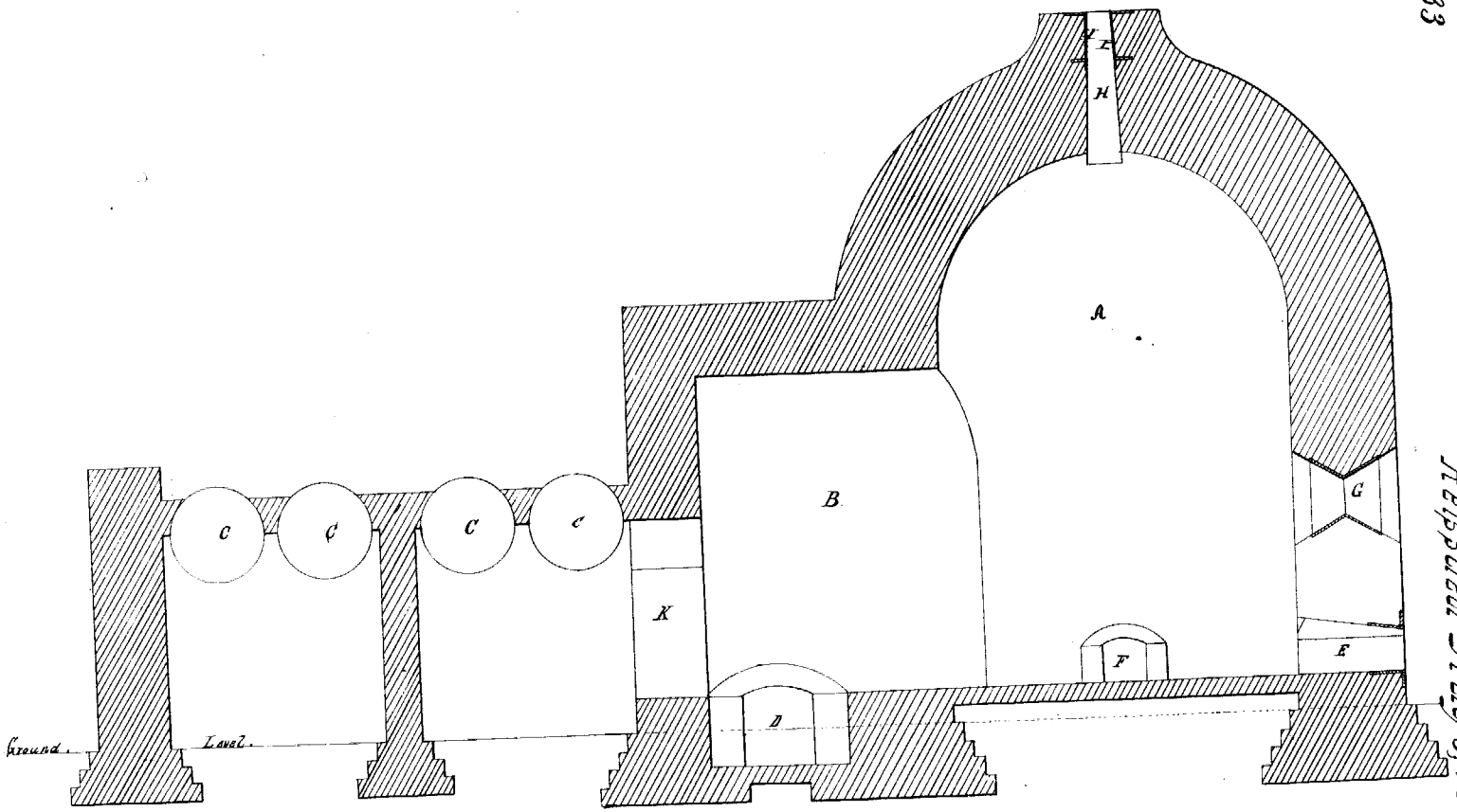
N. PETERS, PHOTO-LITHOGRAPHER, WASHINGTON, D. C.

UNITED STATES PATENT OFFICE.

SAMUEL H. GILMAN, OF NEW ORLEANS, LOUISIANA.

IMPROVEMENT IN BAGASSE-FURNACES.

Specification forming part of Letters Patent No. 13,873, dated December 4, 1855; Reissue No. 383, dated August 5, 1856.

*To all whom it may concern:*

Be it known that I, SAMUEL H. GILMAN, of the city of New Orleans, in the State of Louisiana, have invented a new and useful Improvement in Furnaces for Drying and Burning Bagasse as a Fuel for Practical Purposes; and I do hereby declare the following to be a full, clear, and exact description of the same, reference being had to the annexed drawing, which makes a part of this specification, and lettered to correspond therewith.

The object of my invention is the conversion of this said bagasse as it comes from the mill into such available fuel, in a new and more perfect and certain manner than has heretofore been done, by means of my improvement in the bagasse-furnace aforesaid.

I will now proceed to describe the nature of my invention and the general principles upon which it is based, and which entirely distinguishes it from all other furnaces heretofore made. My object being first to dry the bagasse, I form it into a conoid pile in the furnace, and preserve the size of the pile by continual accessions at its top while burning away at and consequently settling down to its base, and as the green bagasse thus settles down from the top of the pile its temperature and the pressure upon it are gradually increasing until it arrives in the form of a dry dense mass at the burning base, having been dried by its own fire and compressed by its own weight into a comparatively dense mass before arriving at the point of ignition. The bagasse being received, dried, compressed, and ignited, my object is to carry the products of its combustion to another part of the same furnace, where the mixture and combustion of the gases are perfected and the ashes and silicious matter deposited. My object, also, is to prevent the formation of slag in the process of the combustion of bagasse by causing the draft through the furnace to pass over the burning surface of the pile with such strength and direction as will carry off to the second part the slag-generating products of combustion and prevent their accumulation at or near the fire in a sufficient quantity to form slag or cinders. The outlines of the interior surface of the receiving part of my furnace are all curvilinear, and adapted to the conoid form of the pile of bagasse; consequently the channel around the pile for the passage of the draft of air is also curvilinear, and the next best to a straight line for the most rapid transmission of fluids. The outlines of the interior surface of the second part of my furnace are all rectilinear, which is the best form to facilitate the confusion of the currents and reducing and causing mechanically the mixture of the gaseous matters, and the deposit of the solid matters as they arrive from the first or receiving part of the furnace, in which first part the curvilinear channels offer so little obstruction to the passage of air that a natural draft is adequate to all the purposes of combustion and carrying off the slag-generating products without the aid of any blast.

Having thus stated the object of my invention and the general principles upon which it is based and by which it is distinguished from all others, I will now proceed to describe the plan which has proved entirely successful in taking off seven entire crops with furnaces of various sizes the present season of 1855 and 1856, and this experience is the basis upon which this specification is written. The time required to dry the bagasse and the quantity to be dried and burned in a given time determine the size of the furnace. I found the time required to dry the bagasse while in a self-compressed conoid pile burning at its base to be eighty minutes, and that the quantity of bagasse formed in eighty minutes, when making sugar at the rate of six hundred pounds per hour, would make a conoid pile fourteen feet high and ten feet in diameter at its base. Therefore I construct my furnace as follows: That part of my furnace in which the bagasse is received, dried, compressed, and ignited is in the form of a vertical hollow cylinder twelve feet in diameter, closed at the top by a hemispherical dome the interior of which is seventeen feet high from the bottom of the cylinder. The part of my furnace in which the products of combustion are received, mixed, and their solid parts deposited is of a square and arch-covered form eight feet wide and eleven feet high to the interior top of the arch, and opens out its full size from the aforesaid cylindrical part, making the entire length of the furnace through the round and square parts twenty feet. In the center, near the base of the rear wall of the square part, I make a throat or flue, through which the available heat of the furnace passes off to the boiler or evaporating-pans. The area of the vertical cross-section of this throat is one-third the area of the vertical cross-section when the cylindrical and square parts of the furnace unite.

To give the furnace sufficient strength and to prevent the radiation of heat, the walls should be about three feet thick, and to give a level bearing for the bed-plate of the hopper the dome brick-work is coned up on the outside to a thickness of four feet. Through the apex of the dome from the outside to inside is an open throat, through which the bagasse falls from a hopper into the furnace. This throat is made fire and smoke tight by swinging doors in the bottom of the hopper. The hearth of the furnace is solid, and at or near the ground level. In the wall of the circular part, and directly opposite the flue through which the heat finally passes off from the square part, and on a level with the hearth, I make the draft-door about fifteen inches wide and two feet high, the opening of the door widening as it reaches the inside of the furnace-wall to thirty inches in width and falling to twenty inches in height. The top of the door and opening is of an arched form, and is made of and lined with metal. I here give the size and proportions of this door which I consider best. They may be somewhat varied, perhaps, in the furnaces of different capacity; but the locality of this door I regard as essential, and it should always be situated so that a vertical plane passing through the middle of the square part of the furnace and extended through the center of the circular part would divide it vertically into equal parts. About three feet six inches above the floor, and directly in line above the draft-door, I make a doubly-conical opening in the wall in the form of sections of two cones meeting each other midway the chamber-wall. The middle portion of this opening is lined with sections of two hollow cones to fit it, and fitted with a metal door. I call this the "fire-door," because, in order to kindle the fires and keep the bagasse supplied therewith, and other required purposes, wood, from time to time, is thrown in at this door. On the radial line, which is a right angle to the radial line on which the above doors are constructed, I make openings, one on each side of the chamber. These openings are of the same size and same construction as that of the draft-door, and are on the horizontal plane with the draft-door aforesaid, and are for the purpose of cleaning the furnace when a final stoppage is made. Directly at the base of the rear wall of the square arched chamber, and through which the throat leading to the boilers or evaporating-pans is made, I make across the furnace a pit in the earth about four feet wide and thirty inches deep. A door at each end of the pit closes the openings in the side walls of this chamber. The openings are two feet square on the outside and enlarged to the width of the pit on the inside. These openings are lined and closed with metal, and are arched at top. I call these the "clear-out doors" of this chamber. The boilers or evaporating-pans are set in masonry or brick-work, and are of the usual or improved styles.

Having thus briefly, clearly, and fully stated the object, nature, principles, size, structure, and form of my furnace for drying and burning bagasse, I will now proceed to its operation.

Operation: The bagasse is taken from the rollers of the mill by the usual endless belt or carrier, which drops it into a hopper immediately over the throat in the dome of the furnace. In the bottom of this hopper are two swinging doors which open by the weight of the bagasse, which passes through into the furnace and forms a conoid pile on its hearth. A fire of wood or coal having been previously lighted on the hearth in front of the draft-door and the furnace well heated, the bagasse ignites around the base of the pile to the height of about three feet, and burns away and settles down as fast as it is received on the top, and thus preserves its size and shape uniform. The time required to form this pile being eighty minutes, it follows that the bagasse is exposed eighty minutes to dry by the heat of the furnace while settling down to the burning belt. The draft is admitted at the draft-door and passes around both sides of the pile through a narrow channel, with a burning-surface on one side and a brick wall on the other side a distance of fourteen feet, to the square part of the furnace, when the different currents meet from the opposite directions, bringing along in their velocity nearly all the ashes or solid products of combustion into the square part of the furnace, when the meeting and mixing of the contents cause the solid matter to deposit in the pit and perfect the combustion of the gaseous matter before it passes through the throat to the boilers or evaporating-pans.

In the drawing, which is a central and vertical section lengthwise the furnace and across the boiler-flues, (the whole section being in the same plane,) A is the cylindrical dome-covered chamber. B is the arched-covered chamber. C are the boilers, (or evaporating-pans, which can be set instead of the boilers.) Four boilers are shown, so as to represent a flue and return-flue under the boilers, which are all set two and two in a flue. D is the pit athwart the arched-covered chamber. E is the draft-door. F is one of the clean-out doors of chamber A. G is the fire-door for wooding up. H is the throat leading to the hopper. I is the metallic lining of the top of the throat. K is the issue or throat leading to the flues under the boilers.

No. 383.—*Improvement in Bagasse Furnaces.*

What I claim is, combining with the receiving chamber a square mixing or second chamber, whose hearth is substantially level with that of the receiving chamber B, separate and distinct from the heat conduit or flue which conducts the heat to the boilers, and located between the aforesaid heat conduit and the receiving chamber of the furnace, and combined with any bagasse furnace; for receiving the products of the burning bagasse, mixing mechanically, and perfecting the combustion of the gases thereof, after they pass out of the first or burning chamber, and before they enter the heat conduit, or flue, and thereby promoting the deposit of the solids, substantially as described, whether the said second chamber B is provided with a pit D or not.

I also claim the use and adaptation of the pit D, located in and combined with the second or mixing chamber B, as an auxiliary to increase the agitation and perfect the mixture and combustion of the gases, and also to promote the deposit of the solids, substantially as described.

SAMUEL H. GILMAN.